United States Patent Office 3,504,046
Patented Mar. 31, 1970

3,504,046
ALKYLATION OF NAPHTHALENE WITH PROPYLENE IN THE PRESENCE OF PHOSPHORIC ACID CATALYST
Edward Jonathan Scharf, Somerville, and Herbert Rudolph Kemme, Piscataway, N.J., assignors to American Cyanamid Company, Stamford, Conn., a corporation of Maine
No Drawing. Filed Apr. 26, 1968, Ser. No. 724,626
Int. Cl. C07c 3/54
U.S. Cl. 260—671               2 Claims

ABSTRACT OF THE DISCLOSURE

The alkylation of naphthalene with propylene in the presence of solid phosphoric acid catalysts is conducted at temperatures above about 300° C., whereby the ratio of beta- to alpha-isopropyl naphthalene in the product is substantially increased.

---

This invention relates to an improved method for the production of isopropyl naphthalenes. More particularly, it relates to an improved process for the preparation of isopropyl naphthalenes wherein a high ratio of beta to alpha isomers is obtained.

A number of processes have been employed or proposed for preparing alkylated napthalenes. In some the yields are poor and in others the concentration or more than one isomer is significant. The difficulties of resolving isomeric mixtures of alkylated naphthalenes is complicated by the fact that the isomers have very closely related boiling points. In instances where the beta isomer is desired, for example where it is to be converted into beta naphthol by subsequent oxidation and acidification of the oxidized intermediate, it is important that the alkyl naphthalene be predominantly beta isomer in order to ensure the best possible yields of the desired product. The presence of appreciable quantities of the alpha isomer in the isomeric mixture of alkylate results in contamination of the final product with the alpha isomer. In view of the difficulties of separating the pure isomers from isomeric mixtures of alkylated naphthalenes, coupled with the diffculties of oxidizing isomeric mixture thereof which contain significant quantities of the alpha isomer, there exists the need for improved methods of alkylation of naphthalene wherein the product contains the beta-isomer in high ratio.

The reaction of propylene with naphthalene to produce isopropyl nathphalene is well known. Various catalysts have been proposed or employed for use in this reaction. Solid phosphoric acid catalysts, such as phosphoric acid on inert carriers like kieselguhr, have been reported in the alkylation of benzenes. Thus, U.S. 2,575,457 and U.S. 2,584,102 disclose the preparation of such catalysts and their use for the alkylation of aromatic compounds, including naphthalene. Similarly, U.S. 3,201,486 discloses a process for the alkylation of alkylatable organic compounds, including naphthalene, using a solid phosphoric acid. A similar process is disclosed in U.S. 3,183,233. However, there is no disclosure in these patents of the production of isopropyl naphthalene with a high beta-isomer content.

It has now been discovered that when the alkylation of naphthalene with propylene in the presence of the solid phosphoric acid catalyst is carried out at a temperature above about 300° C., i.e., from about 300° C. to about 400° C., the ratio of beta to alpha isomer in the isopropyl naphthalene product is markedly higher than that obtained at lower temperatures. This is a surprising result since it would be expected that the higher temperature would make such a difference in the isomer product ratio.

In accordance with the present invention the solid phosphoric acid catalyst and the naphthalene are charged into a suitable reaction vessel, such as an autoclave. The system is purged with nitrogen and then with propylene. The mixture is then heated to the desired temperature, agitation started and the reaction allowed to proceed under autogenous pressure. Upon completion of the reaction, the reactor is cooled, the product mixture withdrawn and the catalyst separated.

Any of the solid phosphoric acid catalysts disclosed in U.S. Patent Nos. 2,575,457, 2,584,102, 3,183,233 and 3201,486 may be used in the invention. In general, they are comprised of phosphoric acid on an inert support, such as kieselguhr. They are used in the alkylation reaction in an amount, based on the total weight of naphthalene and proylene used, of at least about 1% by weight. Although the reaction appears to be relatively insensitive to catalyst loading, it is preferred to used the catalyst in an amount of from about 5% to about 20% by weight. The catalyst is insoluble in the reaction medium and constitutes a separate, heavier phase, which is easily separated after the reaction, such as by filtration.

As aforeindicated, the ratio of beta to alpha isomer obtained in the reaction is substantially increased when the reaction is conducted at temperatures above about 300° C., particularly above about 350° C. Thus, although other reaction parameters, such as the degree of conversion achieved and ratio of naphthalene to propylene used, exert other effects, the beta to alpha isomer product ratio is critically dependent on the reaction temperature. For example, while longer reaction time gives increased conversion of the naphthalene, the formation of higher alkylates (di-, tri-, tetra-isopropyl naphthalenes) is increased also. However, this may be largely overcome by operating the reaction at low conversions and recycling the reactants. Also, the ratio of naphthalene to propylene employed has an effect on the amount of higher alkylates formed in the reaction. Thus, while the reaction may be conducted using equimolar amounts of propylene and naphthalene, and even slight excesses of propylene, it has been found that the formation of monoalkylated product is favored by the use from 1 to about 10 moles of naphthalene per mole of propylene, i.e., a mole ratio of naphthalene to propylene of from 1 to about 10, and particularly about 5–10.

Pressure is not a critical parameter of the reaction from the standpoint of producing a high beta/alpha isomer ratio. The reaction is normally operated under autogenous pressure, although the reaction may be additionally pressurized with propylene or an inert gas, such as nitrogen.

The alkylation may be conducted either batchwise, for example, in an autoclave, or continuously, for example, using the catalyst in fixed bed operation. Reaction times in a continuous reaction system may be quite short, operating at low naphthalene conversions and recycling the reactants.

Although not preferred, the alkylation may be conducted in the presence of a solvent which is inert with respect to the reaction. Thus, such solvents as halogenated hydrocarbons, for example, carbon tetrachloride, may be used, if desired.

The invention is illustrated in the following example.

EXAMPLE

A series of alkylation reactions (Runs 1–8) were carried out according to the following procedure. The appropriate amount of solid phosphoric acid catalyst and naphthalene were charged to an autoclave. The temperature was raised to about 80° C., to melt the naphthalene and the system was purged with nitrogen. The nitrogen was then purged with propylene. (The amount of propylene remaining in the autoclave at atmospheric pressure is insignificant and no reaction occurs under these conditions.) The autoclave was then sealed, and heated to the indicated temperature. After pressurizing the system to the desired pressure with propylene, agitation was started. Additional propylene was added as required to maintain this pressure as the reaction proceeded. The reactions were conducted under the conditions shown in Table I. The cooled reaction mixtures, after filtering off the catalyst, were analyzed by vapor phase chromatographic methods with the results shown in Table I.

The solid phosphoric acid catalyst used in all of the runs consisted of a calcined mixture of about 21.5% by weight of kieselguhr as adsorbent support and about 78.5% by weight of phosphoric acid containing about 83% $P_2O_5$. The catalyst in this instance was in the form of a powder. However, it may suitably be in the form of pellets, granules, or the like.

As can be seen from the data in Table I, the ratio of beta to alpha isomer obtained is markedly higher when the reaction is conducted at 300–350° C. (Runs 3–8) as compared to 200° C. (Runs 1 and 2). It will be seen, furthermore, that the higher reaction temperatures provide these higher ratios over a wide range of reaction times, pressures and mole ratios or naphthalene to propylene. Thus, even at short reaction times and low pressures the proportion of the beta isomer is substantially increased. It is thus seen that the obtainment of the higher ratios is most critically dependent on the temperature of the reaction.

We claim:
1. In a process for the manufacture of isopropyl naphthalene wherein naphthalene is reacted with propylene in the presence of a solid phosphoric acid catalyst at superatmospheric pressure, the improvement which comprises carrying out the reaction at a temperature above about 300° C.
2. The process of claim 1 wherein the reaction temperature is from about 300° C. to about 400° C.

TABLE I.—ALKYLATION OF NAPHTHALENE WITH PROPYLENE

| Run No. | Catalyst, Percent | Pressure (p.s.i.g.) | Temp. (° C.) | Time (min.) | Mole Ratio N/P | Analysis | | | | |
|---|---|---|---|---|---|---|---|---|---|---|
| | | | | | | Percent N | Percent $\alpha$ IPN | Percent $\beta$ IPN | Ratio Percent $\beta$/Percent $\alpha$ | Percent PIPN |
| 1 | 15.0 | 200 | 200 | 63 | 2.5 | 63.9 | 21.3 | 7.7 | 0.36 | 7.1 |
| 2 | 15.0 | 1,000 | 200 | 3 | 17.0 | 93.0 | 4.2 | 2.2 | 0.52 | 0.6 |
| 3 | 5.0 | 80 | 300 | 7 | 17.0 | 92.6 | 3.8 | 3.6 | 0.95 | (1) |
| 4 | 5.0 | 90 | 300 | 54 | 4.7 | 75.9 | 11.8 | 8.5 | 0.72 | 3.8 |
| 5 | 5.0 | 90 | 300 | 180 | 2.4 | 54.6 | 22.6 | 17.5 | 0.78 | 5.3 |
| 6 | 15.0 | 200 | 350 | 12 | 2.1 | 51.8 | 17.6 | 22.2 | 1.26 | 8.4 |
| 7 | 15.0 | 800 | 350 | 450 | 1.0 | 16.0 | 17.2 | 34.8 | 2.02 | 32.0 |
| 8 | 15.0 | 1,000 | 350 | 5 | 2.6 | 62.1 | 17.3 | 12.8 | 0.74 | 7.8 |

P=Propylene; N=Naphthalene; IPN=Isopropylnaphthalene; PIPN=Polyisopropylnaphthalenes.
1 =No higher alkylates found.

References Cited

UNITED STATES PATENTS 3,183,233  5/1965  Bloch _____ 260—671
3,201,486  8/1965  Bielawski et al. _____ 260—671

DELBERT E. GANTZ, Primary Examiner

C. R. DAVIS, Assistant Examiner